Nov. 12, 1957   R. C. MACHLER   2,813,203
OPTICAL SYSTEMS FOR RADIATION PYROMETERS
Filed April 7, 1950   3 Sheets-Sheet 1
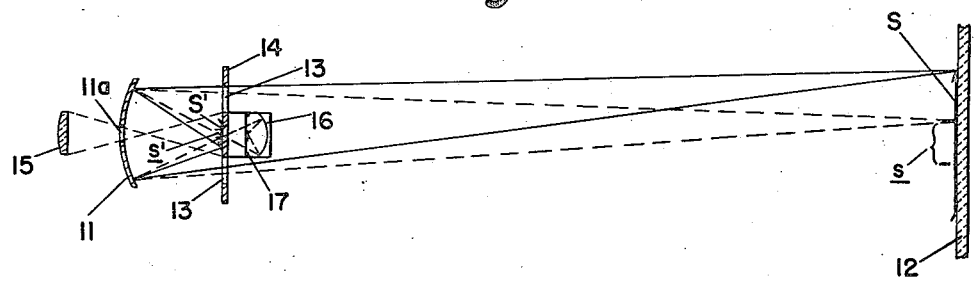
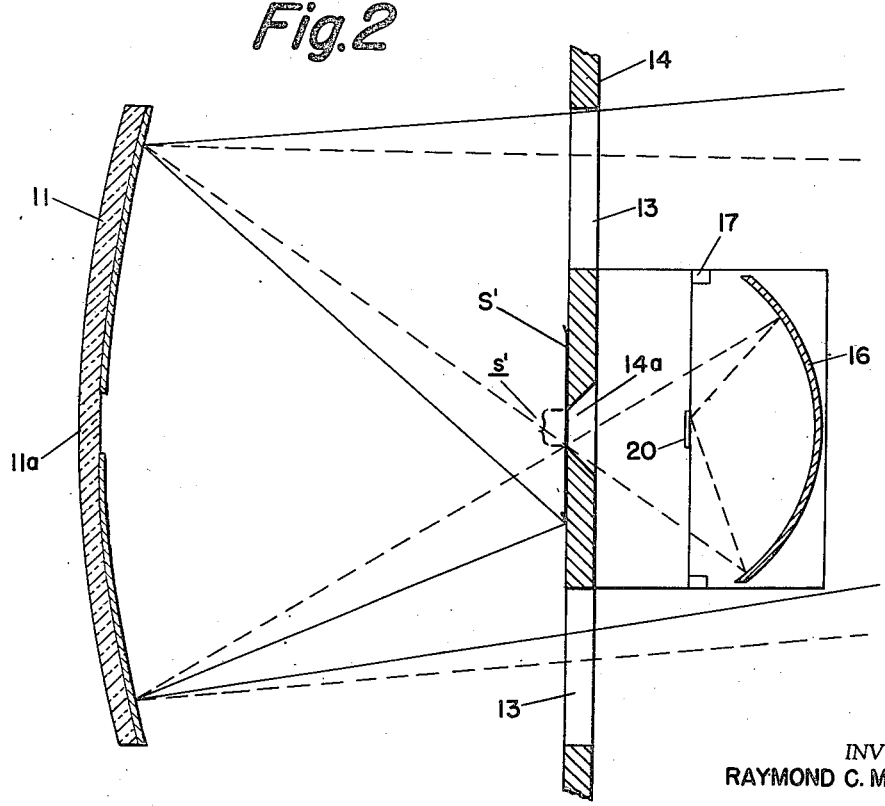
INVENTOR.
RAYMOND C. MACHLER
BY
Woodcock and Phelan
ATTORNEYS.

Nov. 12, 1957 R. C. MACHLER 2,813,203
OPTICAL SYSTEMS FOR RADIATION PYROMETERS
Filed April 7, 1950 3 Sheets-Sheet 2
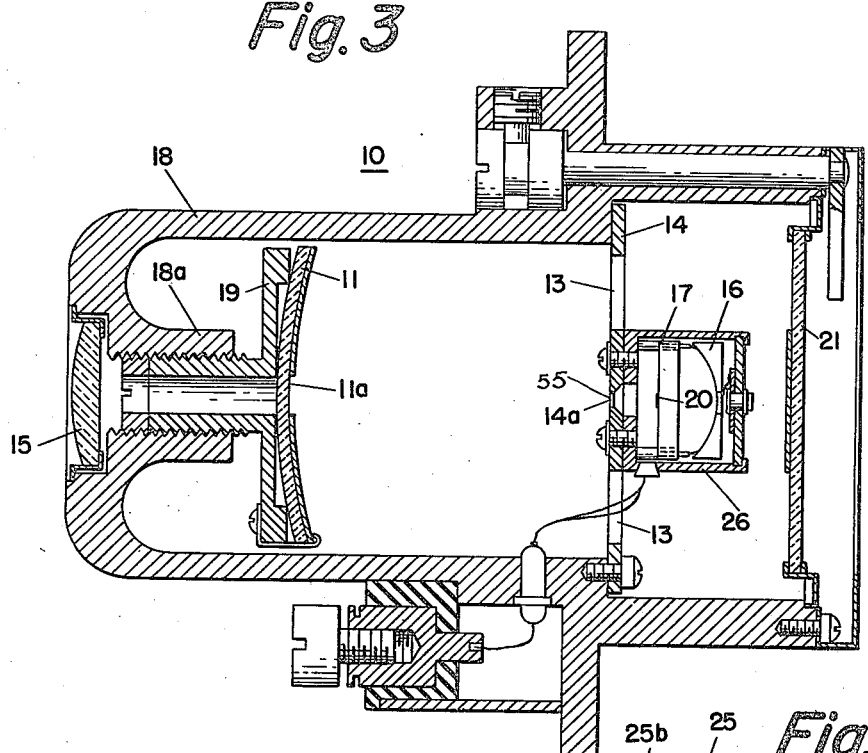
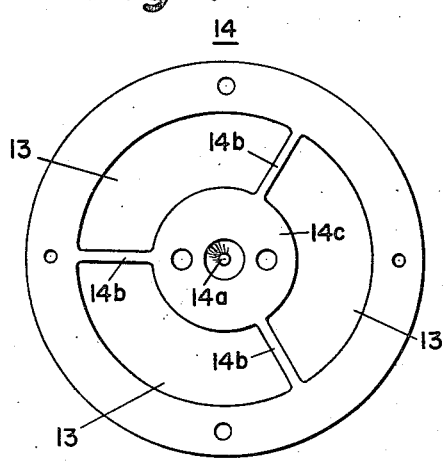
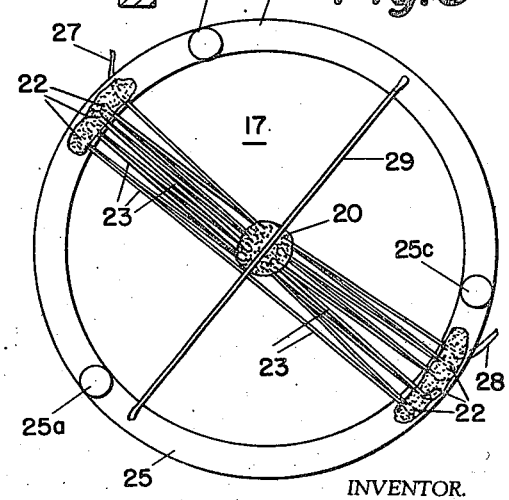
INVENTOR.
RAYMOND C. MACHLER
BY
Woodcock and Phelan
ATTORNEYS.

Nov. 12, 1957 R. C. MACHLER 2,813,203
OPTICAL SYSTEMS FOR RADIATION PYROMETERS
Filed April 7, 1950 3 Sheets-Sheet 3
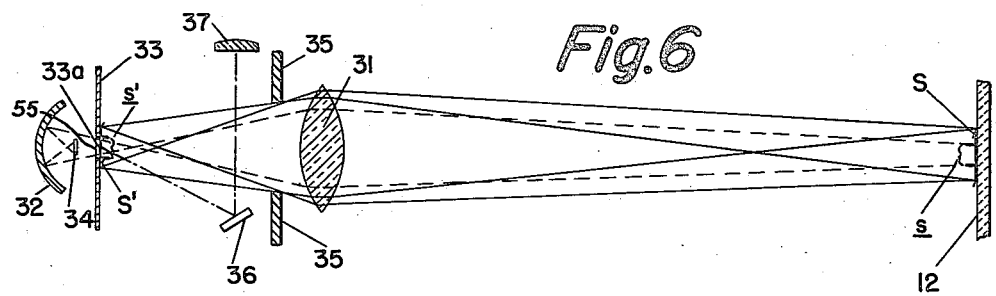
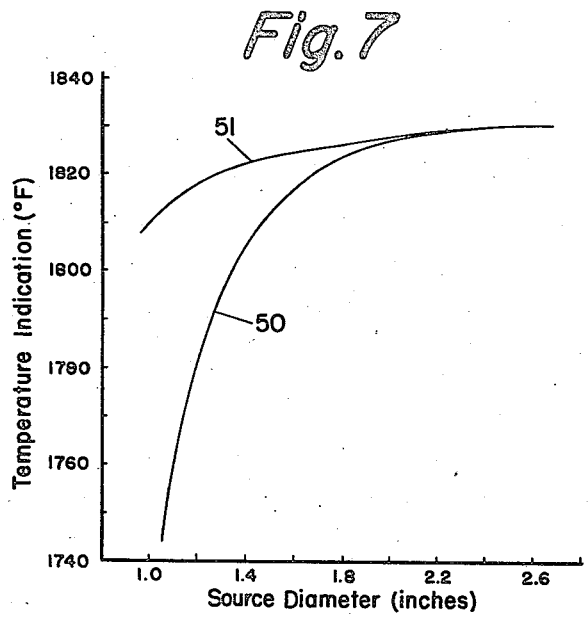
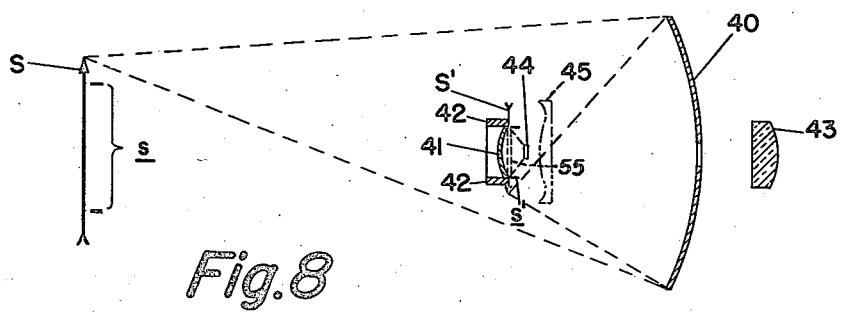
INVENTOR.
RAYMOND C. MACHLER
BY
Woodcock and Phelan
ATTORNEYS.

United States Patent Office 2,813,203
Patented Nov. 12, 1957

2,813,203

OPTICAL SYSTEMS FOR RADIATION PYROMETERS

Raymond C. Machler, Philadelphia, Pa., assignor to Leeds and Northrup Company, Philadelphia, Pa., a corporation of Pennsylvania Application April 7, 1950, Serial No. 154,690

29 Claims. (Cl. 250—220)

This invention relates to aparatus for measuring the temperature of a body from which radiant energy is emitted and has for an object the provision of improved optical systems for radiation pyrometers wherein the efficient energy-concentrating property of a wide angle optical element is combined with the sharp image-forming property of a narrow angle optical element to produce a high radiant energy intensity at the measuring element.

An ideal optical system for a radiation pyrometer is one which concentrates radiant eneregy from only a small surface area of a hot body upon the radiant-energy sensitive surface of a detector and excludes therefrom all radiation from the remainder of the body's area and from objects surrounding it. With radiation pyrometers having the conventional single optical element (either a lens or a mirror), it is not possible simultaneously to attain the two objectives of an ideal optical system, namely, the acceptance only of energy from a sharply defined surface area of a hot body and the production of as high a radiant energy flux as possible at the energy detector. Due to aberations, either spherical or chromatic or both, an efficient energy-concentrating system having a single optical element has poor image-forming properties. Also, a lens or mirror which can produce a well defined image delivers relatively little energy per unit area at the measuring element or detector.

It is to be understood that the mere utilization of two or more optical elements in the optical system of a radiation pyrometer is not new per se, nor does it form the subject of this invention. The present invention is directed toward the new and useful manner in which optical elements and a target area defining means have been combined with a measuring element or detector, and which combination produces improved measurements of temperature by means of a radiation pyrometer. In radiation pyrometers of the prior art utilizing two-element optical systems, the secondary element, usually a spherical concave mirror, has been used to redirect the radiant energy which passes the front surface of the target area of the radiant-energy sensitive detector so that such energy may be received on the back surface of the target area. While in some of these pyrometers the primary element has been a mirror and in others it has been a lens, in all such two-element systems the primary element has been disposed for concentrating the radiant energy intercepted from the source and focusing it upon the target area of the detector, the secondary mirror being provided for deriving some extra output from the thermopile or detector by reflecting radiation onto the back of the thermopile that normally passed through its openings.

Furthermore, in radiation pyrometers of the foregoing type which have had a diaphragm disposed near the radiation detector, the principal function of the diaphragm was for protecting the cold junctions of the thermopile from receiving unwanted radiant energy. Since the diaphragm was not coplanar with the radiant-energy sensitive element or elements and was not imaged onto it or them, the secondary function of the diaphragm to define the source area "sighted" was only approximate. In marked contrast, the present invention provides a primary optical element for intercepting radiant energy from the source and fccusing it upon a precise target-defining aperture, substantially all the radiant energy passing through the aperture being intercepted by the second optical element and concentrated upon the radiant-energy sensitive surface of the detector within a smaller area than the area of said aperture, thus to provide a high radiant-energy flux density at the detector or measuring element and substantially uniform representation of each element of the selected target in the output of the pyrometer.

Thus, while heretofore radiation pyrometers have been provided employing two or more optical elements in their optical systems, no attempt has been made so provide a two-element optical system for combining the efficient energy-concentrating property of a wide angle optical element with the sharp image-forming property of a narrow angle optical element for concentrating radiant energy from a small surface area only of a hot body upon the radiant-energy detector and precisely excluding all radiation from the remainder of the body's area and from objects surrounding it.

In accordance with the present invention there is provided an improved optical system for a radiation pyrometer comprising a plurality of optical elements. There is provided a first optical element which is directed toward the body whose temperature is to be measured and from which radiation is emitted. The first optical element intercepts radiant energy from an area of the body and produces an optical image of such area. There is also provided means including a second optical element for intercepting radiant energy from a sharply defined fractional area of the optical image of the area of the body. Spaced from the second optical element there is provided a radiant-energy sensitive detector having a receiving area upon which said intercepted radiation is directed by the second optical element for the production upon said area of an image of said fractional area of said optical image smaller than said radiation-receiving area of the detector. In some forms of the invention both optical elements may comprise mirrors, while in other forms of the invention the first optical element may comprise a lens.

More particularly, in one form of the invention two spherical concave mirrors may be positioned in face-to-face relation with a diaphragm interposed therebetween. The primary mirror is preferably a narrow angle mirror and is directed toward the source of radiant energy. The primary mirror intercepts radiant energy from the source and projects an image of the source on a surface of the diaphragm. The diaphragm is provided with a small opening, and only radiation from a sharply defined area of the source image will pass through the opening in the diaphragm. The secondary mirror is preferably a wide angle mirror, and all of the energy which passes through the opening in the diaphragm strikes the secondary mirror which, in turn, concentrates this radiation upon a small radiant-energy sensitive detector interposed between the diaphragm and the secondary mirror. The secondary mirror is so constructed and arranged as to form a miniature image of the opening in the diaphragm upon the surface of the detector. Since the image is smaller than the opening in the diaphragm, the radiant energy flux density at the detector is greater than it is at the opening in the diaphragm. There is also provided an eye piece for viewing the image formed on the surface of the diaphragm and, thus, the focus may be checked and alignment of the radiation pyrometer may be readily adjusted for superimposing the desired portion of the source image upon the opening in the diaphragm.

Therefore, it is an object of the invention to provide an optical system for a radiation pyrometer wherein radiant energy from only a sharply defined limited portion of a target area is directed to the detector and which includes means for producing a high radiant energy flux density at the detector.

Another object of the invention is to provide improved means for sighting a radiation pyrometer onto a sharply defined portion of a target area.

A further object of the invention is to provide a radiation pyrometer wherein filters for restricting the radiant energy received by the radiant-energy responsive detector to a specific band of wavelengths may easily be applied and may be of minimum size.

A still further object of the invention is to provide an optical system for a radiation pyrometer wherein the radiant energy received by the detector may be limited to any selected area of the body from which the radiant energy is emitted.

Another object of the invention is to provide an optical system for a radiation pyrometer wherein the variation of the size and distance of the target area onto which the instrument is sighted will produce a minimum of variation in the electrical characteristic of the radiation-sensitive detector.

For further objects and advantages of the invention and for a more detailed understanding of the invention, reference is to be had to the following description taken in conjunction with the accompanying drawings, in which:

Fig. 1 diagrammatically illustrates the optical system of one modification of the invention;

Fig. 2 is an enlarged fractional view of the left-hand portion of the optical system shown in Fig. 1;

Fig. 3 is a sectional view of a radiation pyrometer embodying the optical systems of Figs. 1 and 2;

Fig. 4 is a plan view of the diaphragm 14 of Fig. 3;

Fig. 5 is a plan view of the radiant-energy sensitive detector 17 and associated parts of Fig. 3, greatly enlarged;

Fig. 6 diagrammatically illustrates the optical system of another modification of the invention;

Fig. 7 is a graph comparing temperature indications of single lens and double mirror optical systems with variation in the diameter of source sizes; and Fig. 8 diagrammatically illustrates the optical system of a further modification of the invention.

Referring now to the drawings, there has been diagrammatically illustrated in Fig. 1 an optical system embodying one form of the invention, a commercial embodiment of which has been illustrated as applied to the radiation pyrometer 10 shown in Fig. 3. As shown in Fig. 1, there is provided a first optical element in the form of a spherical narrow angle primary mirror 11 which is adapted for direction toward the hot body or source of radiant energy 12 illustrated as a section of a refractory wall, the temperature of which is to be measured. The concave primary mirror 11 intercepts the radiation emanating from an area S of the source 12 which passes through the annular opening 13 located inside of the outer edge of the diaphragm 14 and produces an optical image S' of the area S on the back surface of the diaphragm 14. The rays of radiant energy emitted from the source area S have been diagrammatically illustrated in Figs. 1 and 2 as solid-line rays and are shown as emanating from the head-end of an arrow representing one dimension of the source area S. The solid-line rays are intercepted by the primary mirror 11 and are reflected onto the back surface of the diaphragm 14 to form an inverted optical image S' of the source area S. The image S' is inverted as the rays have been intercepted by only one optical element. Since the rays from the source area S actually strike the back surface of the diaphragm 14, the reflected image S' produced there of the source area S is said to be a real image as distinguished from a virtual image.

It is to be observed that the mirror 11 has not been metallized at its central portion and thus provides a transparent opening 11a through which there may be viewed by means of an eye piece 15 the image S' produced on the back surface of the diaphragm 14, Figs. 1 and 2. By viewing the image S' through the eye piece 15, the optical system of the radiation pyrometer may readily be aligned so as to position the image S' centrally of the diaphragm 14. It is to be further observed that there is a small opening 14a at the center of the diaphragm 14 and by proper orientation of the optical system of the radiation pyrometer 10, a selected portion or fractional area $s'$ of the optical image S' may be circumscribed by the perimeter of the opening 14a. In this manner radiation from only a sharply defined portion or fractional area $s$ of the source area S passes through the opening 14a to a second optical element, namely, the wide angle secondary mirror 16 which redirects and concentrates the intercepted radiation upon a radiant-energy sensitive detector 17. The sharply defined fractional area of the source S has been illustrated in Fig. 1 as that portion $s$ located between the two short parallel lines which are perpendicular to the arrow S and intermediate the ends thereof. The rays of radiant energy emitted from the portion $s$ have been diagrammatically illustrated as broken-line rays emanating from the end of the portion $s$ adjacent the head-end of the arrow. As may clearly be seen in Fig. 2, the broken-line rays from portion $s$ are first intercepted by the primary mirror 11 and are then redirected for passage through the opening 14a in diaphragm 14. After passage through the opening 14a, the broken-line rays are intercepted by the secondary concave mirror 16 and are redirected therefrom for concentration upon the radiant-energy sensitive surface or target area 20 of a detector 17.

While for purposes of explanation and for clarity in the drawings the radiant energy emanating from the source area S has been diagrammatically shown as a single pair of rays emanating from a point source, it readily will be understood by those skilled in the art of pyrometry that similar rays will emanate from each and every point in the source area S, a fractional part thereof being formed by area $s$. These rays would be reflected by the primary mirror 11 for redirection to the back surface of diaphragm 14 for production of the optical image S', the fractional area $s'$ thereof being superimposed upon the opening 14a in the diaphragm. Similarly, rays of radiant energy will emanate from every point in the image $s'$ for interception by the secondary mirror 16 and redirection to the radiant-energy sensitive surface or target area 20 of detector 17.

As will be noted, Figs. 1 and 2, the principal axes of both concave spherical mirrors 11 and 16 coincide with the axis of the optical system, and the radius of curvature of the primary mirror 11 is considerably greater than that of the secondary mirror 16. The semi-aperture of the primary mirror 11, i. e., one-half the diameter of its circular boundary, is small as compared to its radius of curvature, thus to provide a narrow angle optical element having a sharp image-forming property. The ratio of the semi-aperture of the secondary mirror 16 to its radius of curvature is relatively large with respect to a similar ratio of the semi-aperture and radius of curvature of mirror 11 in order to provide a wide angle optical element having high energy-concentrating properties. The target area 20 of the detector 17 also has its axis coincident with the axis of the optical system and is disposed at the image point along the principal axis of the secondary mirror 16 between its reflecting surface and center of curvature. The secondary mirror 16 concentrates the radiation received through the diaphragm opening 14a and reflects a miniature image of the opening 14a upon the target or radiant-energy sensitive area 20 of the detector 17, the area of said miniature image being smaller than the target area 20, thus to provide a higher radiant energy flux density or intensity of radiation at the target area 20 than at the opening 14a in the diaphram. Thus, it will be seen that the diaphragm opening 14a and the target area 20 are located at the conjugate foci of the secondary mirror 16.

As shown in Fig. 3, the primary mirror 11 is adjustable for movement along the optical axis of the system so as to permit adjustment of the focus of the instrument. Such adjustment is provided by the threaded engagement of the holder 19 for the mirror 11 within the internally threaded portion 18a of the housing 18. By adjusting the focus of the instrument the relative positions of the surface of the diaphragm 14 facing the mirror 11 and the mirror 11 will be such that the former will be substantially in the focal plane of the mirror 11 conjugate to that of the radiating body or area S so that the real image S' falls on the surface of the diaphragm 14 facing mirror 11 and covers the diaphragm opening 14a. The surface of the diaphragm 14 facing the opening or aperture 11a is provided with a coating of magnesium oxide. The coating has the following properties: It does not scatter or reflect appreciable radiation in the infra-red region where the greater amount of radiant energy from hot bodies is emitted. Hence, that surface does not result in errors due to the presence of scattered radiation. Radiation entering the pyrometer 10 from other than the optical line of sight is not reflected within the housing since the interior surfaces are coated with a dull black paint except the window, mirrors and the surface coated with magnesium oxide. The latter coating provides a visual image of the sharply defined area of the source and, hence, provides a means by which the pyrometer may be sharply focused. A window 21 is provided to protect the interior of the instrument from ingress of foreign material. The eye piece 15, the window 21, and the housing 18 as a whole may be sealed for operation of the detector 17 under subatmospheric or superatmospheric pressure with air or other gases. The window 21 may be made of quartz or other material which will pass energy in the infra-red region and which will withstand the heat to which it may be subjected in use.

The detector 17 may be of the thermocouple type wherein the temperature of the source may be determined from the electromotive force developed by the thermocouples, and preferably, it may be of the ambient temperature independent type described and claimed in application Serial No. 139,308, filed January 18, 1950 by William G. Fastie, a co-employee of mine, which issued as Patent Number 2,601,508 on June 24, 1952 and was reissued as Re. 23,615 on January 13, 1953. Such a detector has been illustrated in Fig. 5 wherein the cold junctions 22 of the thermocouples 23 are in intimate heat-conductive relation with a metal mounting ring 25. Though electrically insulated therefrom, they are thermally intimately connected thereto as by a suitable ceramic cement. The mounting ring 25 may be of any suitable metal such as nickel or copper and is provided with three metallic legs 25a, 25b and 25c for thermal connection to a housing 26, Fig. 3. The copper housing 26 and diaphragm 14 form a thermal shield completely surrounding the thermopile 17 and the secondary mirror 16 except for the diaphragm opening 14a which allows radiation to pass to the mirror 16 for reflection upon the target or hot junction area 20. The diaphragm 14, Fig. 4, has three coplanar radial supporting members 14b which divide the annular opening 13 between the rim and the central disc area 14c of the diaphragm into three segments. The size of the extensions 25a, 25b and 25c, Fig. 5, and the thickness of the members 14b, Fig. 4, are so proportioned as to provide the thermal conduction necessary to maintain the central disc area 14c and housing 26 at substantially ambient temperature.

As shown in Fig. 5, the several thermocouples 23 have their hot junctions intimately in thermal contact with the target 20 but electrically insulated therefrom. The target or radiation receiver 20 may include a platinum disc to which is secured a disc of mica. The hot junctions of the thermocouples 23 are secured to the mica disc by means of a powdered black ceramic material known as frit which, upon the application of heat thereto, forms a fused coating securing the hot junctions to the mica disc and providing a black radiation-absorbing surface facing the secondary mirror 16. In order that the electromotive force generated between the output conductors 27 and 28 will be unaffected by ambient temperature change and thus permit accurate temperature measurement, there is provided a thermal shunt 29 in the form of a nickel wire extending diametrically across the ring 25 and at approximately right angles to the thermocouples 23. The purpose and theory of the thermal shunt is clearly set forth in the aforementioned application.

While the opening 14a in the diaphragm 14 has been shown as a circular opening, it is to be understood that it may be of any desired shape such as square, elliptical, rectangular, etc. The ability of being able to limit the radiation received by the detector to that emanating from a particularly shaped area of the hot body or source is of decided advantage in certain applications. If the surface of the body under observation is of large area and of uniform temperature, there may not be any particular advantage in selecting a particular small circular, triangular or rectangular area of it upon which the radiation pyrometer is to be sighted for obtaining the temperature measurement. However, in many applications the temperature of the surface will not be uniform and there will be present therein areas of higher temperature commonly referred to as "hot spots." Also, in many applications the area of the hot body upon which the pyrometer may be sighted is small or may be partially obscured from view. One such application is found in induction heating where a metal rod is being heated within the confines of an induction coil. In order to measure the temperature of the rod by means of a radiation pyrometer, it is necessary to sight on the small section of the rod that is visible between the adjacent, closely spaced turns of the coil. For such application, it is apparent that a narrow slot or rectangle is the desired shape for the opening 14a in the diaphragm 14 in order to limit the view of the detector 17 to the area between the turns of the coil. Another application wherein it is desirable to limit the view of the detector to an area of particular shape is found in the glass making industry wherein glass is fed in liquid form from a glass feeding machine. As the liquid glass is fed from the machine preparatory to being cut into lengths, the liquid stream may move from side to side. Thus, if the opening 14a in the diaphragm is circular, the glass may move across the opening and out of the field of view of the detector. However, if the opening 14a is that of a horizontally disposed rectangle, it is possible for the detector continually to view the glass stream, even though the position of the stream may vary from side to side.

Referring to Fig. 6, there is shown another modification of the invention wherein one of the optical elements of the optical system is a lens. As diagrammatically illustrated, the first optical element is the lens 31 which has been illustrated as a double-convex lens. The second optical element of the optical system comprises the concave mirror 32 which has a wide angle radiation concentrating property similar to the secondary mirror 16 of Figs. 1–3. The lens 31 focuses radiation from the source area S upon the diaphragm 33. The diaphragm opening 33a and the detector 34 are located at the conjugate foci of the spherical mirror 32. A second diaphragm 35 is provided as a range or limiting diaphragm for fixing the solid angle of the rays incident upon the diaphragm 33. The extreme rays of the source area S have been illustrated as solid line rays, and the extreme rays of the fractional area s of the source area S have been illustrated as broken line rays. An inverted optical image S' of the source S has been formed on the surface of the diaphragm 33 with only the rays forming the fractional portion s' of the whole optical image S' passing through the opening 33a in the diaphragm 33 for reflection by the mirror 32 onto the radiant-energy sensitive area of the detector 34. As in the case of the detector 17 and secondary mirror 16 of Figs. 1 and 2, the detector 34 has been so positioned with respect to the center of curvature of mirror 32 so as to produce a miniature image of the diaphragm opening 33a on the detector, thus to provide a higher flux density of radiation at the detector 34 than at the opening 33a in the diaphragm. In order to provide visual means for adjusting the focus and alignment of the optical system of Fig. 6, a mirror 36 is disposed at an angle to the axis of the optical system and spaced therefrom for intercepting rays from the optical image S' produced on the surface of the diaphragm 33. These rays are redirected by the mirror 36 for interception by the eye piece 37. Thus, the operator may look through the eye piece 37 and view the optical image S' formed on the surface of the diaphragm 33, thereby permitting the fractional area s' of the image to be accurately aligned with the opening 33a in the diaphragm. In this manner it is possible to limit the radiation received by the detector to that from a well defined selected portion of the target area of the source.

One of the primary advantages of a radiation pyrometer employing one of the optical systems of the present invention is its ability accurately to measure the temperature of the source even though the source area may be quite small. There has been illustrated in Fig. 7, in graph form, a comparison of a radiation pyrometer having the conventional single element lens system with a radiation pyrometer of the type shown in Fig. 3 employing the two mirror optical system of the present invention showing the variations of the temperature readings of each instrument with variations in the source size. Briefly, a conventional single lens system is similar to the system shown in Fig. 6 with the omission of the concave mirror 32 and with the detector 34 positioned for receiving the rays directly as they pass through the opening 33a in the diaphragm 33. As may be seen from the graph, with source temperature constant at 1830° F., the temperature readings of the pyrometer having the single element lens system (curve 50, Fig. 7) are lower than those of the pyrometer having the double mirror system (curve 51, Fig. 7) for source sizes between one inch and two inches in diameter, and for source sizes near the one inch range by as much as 50° F. Both pyrometers had substantially the same output, but the single element lens system was very sensitive to variations in the source size because of aberrations, i. e., the failure of the lens to bring all of the rays to the same focus. In the two mirror system the mirrors focus all wavelengths at the same distance, whereas in the lens system of Fig. 6 due to the dispersion of the lens material, the long wavelengths are focused at a greater distance than the short ones so that it is impossible to have all parts of the spectrum in sharp focus. This type of aberration is what is generally referred to as the chromatic aberration of a lens. While both the single lens system and the two mirror system are subject to spherical aberration, the latter is less affected thereby. The radiation pyrometer having the two mirror optical system of the present invention also is much less sensitive to radiation from areas of the source other than that fractional area which is imaged on the opening in the diaphragm than is the pyrometer having the conventional single element system. This is due to the fact that chromatic aberration is non-existent and the fact that the selected portion of the target area is literally sharply cut from an already defined target area by the aperture in the diaphragm. This eliminates the "fuzzy-edged" irregular definition of limiting apertures of the prior art devices.

Another form of double mirror optical system for a radiation pyrometer which also has the desired characteristics is shown in Fig. 8. In this modification of the invention, the optical image S' of the source area S is produced by the concave primary mirror 40 in the plane of the concave secondary mirror 41. The secondary mirror 41 is provided with a rim 42 around its edge and provides a surface upon which the outer area of the image of the source S may be seen through the eye piece S. Thus, the rim 42 is similar to and performs the function of the diaphragm 14 of the system in Figs. 1–3 with the diameter of the opening in the diaphragm, in this case being coextensive with the aperture of the secondary mirror 41. The detector 44 is disposed between the two mirrors, and an image of the primary mirror 40 is produced on the surface of the detector 44 by the secondary mirror 41. Here again, as in the previous modifications, the secondary mirror is a wide angle mirror having efficient energy-concentrating properties for concentrating the radiation within the perimeter of the radiant-energy sensitive area of the detector 44. This system has the same advantages as the other modifications previously described and has the further advantage that it is more compact than the other systems if energy from a large area of the source is required for the temperature measurement.

While the optical system of Fig. 8 will give satisfactory performance with a secondary mirror of given focal length and diameter, in some applications it may be desirable to employ a shorter focal-length mirror of the same diameter. In such applications it is desirable to provide a means for correcting the error introduced by the increased abberations. Such a correction may be made by introducing a correcting element 45 into the system. This element may take the form of a Schmidt correcting plate of the improved type disclosed in the monograph entitled "Achievements in Optics" by A. Bouwers, published in 1946 by the Elsevier Publishing Co., Inc., New York, N. Y. As shown in Fig. 8, the correcting element 45 has been illustrated in phantom and is located at the center of curvature of the spherical secondary mirror 41. Briefly, the correcting element 45 is a quartz or other suitably transparent disc, the variations in thickness of which have been considerably exaggerated for the purpose of clarity. The correcting element 45 is designed to improve the image-forming properties of concave mirrors of large diameter to focal length ratio.

In certain pyrometer applications it is desirable to restrict the radiant energy received by the radiant-energy responsive detector to a specific band of wavelengths. Such restriction may be accomplished by the use of a filter plate of the type originally described and claimed in application Serial No. 131,482, filed December 6, 1949 by the applicant and William G. Fastie, a co-employee of applicant, said application now abandoned in favor of application, Serial No. 897,114, filed December 9, 1953. In applying a filter plate to any of the optical systems of the present invention, it will be found that filters which are conveniently very small in size and, therefore, more uniform and more economically produced may be utilized, as it is only necessary that the filter plate as indicated at 55 in Fig. 3 need only be large enough to cover the central opening in the diaphragm which is interposed between the two optical elements in the optical system. Similar filter plates are indicated at 55 in the systems shown in Figs. 6 and 8.

While the radiation detector or receiver in the foregoing optical systems has been described in one form as being of the thermocouple type, it is to be understood that other types of detectors may be utilized, such as bolometers, thermistors or other types of temperature-sensitive resistors.

While there have been described and illustrated certain preferred embodiments of the invention, it will be understood that further modifications may be made without departing from the scope of the invention as set forth in the appended claims.

What is claimed is:

1. A radiation pyrometer for the measurement of the temperature of a body from which radiation is emitted comprising a first optical element for intercepting radiant energy from an area of said body and for producing in the focal plane of said first optical element conjugate to said area an optical image of said area, means including a second optical element intercepting radiant energy from a fractional area of said optical image, said radiation pyrometer including a radiant-energy sensitive detector having a receiving area spaced from said plane, said radiation-receiving area and said second optical element being spaced one from the other for concentration upon said radiation-receiving area of radiant energy only from said fractional area of said optical image and within the perimeter of said radiation-receiving area of said detector.

2. A radiation pyrometer including first and second optical elements and a radiant-energy sensitive device all spaced from each other along an optical path, said first optical element being disposed to receive radiant energy directly from an area of a hot body to focus an image of said area of the hot body in a plane spaced from said radiant-energy sensitive device, and said second optical element being disposed to focus radiation from said image onto said radiant-energy sensitive device.

3. A radiation pyrometer having an optical system comprising a first optical element for intercepting radiant-energy from an area of a source of radiant-energy for producing an image of said area in the focal plane of said first optical element conjugate to said area, a radiant-energy sensitive detector having radiant-energy receiving means disposed in a second plane spaced from said focal plane, a second optical element, and means in the optical path following said first optical element for limiting reception of radiant energy by said second optical element to that from a finite portion of said image formed in said focal plane, said second optical element concentrating said energy upon said radiant energy receiving means in said second plane.

4. A radiation pyrometer for the measurement of the temperature of a body from which radiation is emitted comprising a first optical element for intercepting radiant energy directly from an area of said body and for producing in the focal plane of said first optical element conjugate to said area an optical image of said area, means including a second optical element intercepting radiant energy from a fractional area of said optical image, said radiation pyrometer including a hot-junction area of a thermocouple spaced from said plane, said hot-junction area and said second optical element being spaced one from the other for production upon said last-named area of an optical image of only said fractional area of said optical image and within the perimeter of said hot-junction area of said thermocouple.

5. In a radiation pyrometer for measuring the temperature of a body from which radiant energy is emitted, the combination affording accurate measurements despite variation in area of said body comprising a diaphragm, a first optical element for producing an optical image of an area of the body upon one surface of said diaphragm positioned in the focal plane of said first optical element conjugate to said area, said diaphragm having an opening therein, the perimeter of which circumscribes a selected fractional area of said optical image for passage of radiation therefrom through said opening, a radiant-energy responsive detector spaced from said diaphragm, and a second optical element intercepting said radiation which passes through said opening, said second optical element being spaced from said radiant-energy responsive detector to project said intercepted radiation in the form of an optical image of said opening upon a surface of said radiant-energy responsive detector wherein the density of radiant energy at said last named surface is greater than the radiant energy density at said opening.

6. An improved optical system for a radiation pyrometer comprising a first concave mirror for direction toward an area of a source of radiant energy, a second concave mirror, means for supporting said mirrors in face-to-face relation within the housing of the radiation pyrometer, means including said first mirror for producing an optical image of the source of radiant energy in the focal plane of said first mirror conjugate to said source and for interception by said second mirror of radiant energy from a fractional area of said optical image, and a radiant-energy responsive detector having a sensitive area disposed between said mirrors in the focal plane of said second mirror conjugate to said focal plane of said first mirror to receive from said second mirror said intercepted radiant energy from said fractional area of said optical image, said second mirror having high energy-concentrating properties so as to concentrate the radiant energy received from said first mirror to produce upon said radiant-energy responsive detector a miniature optical image of said fractional area of said optical image of said source.

7. An improved optical system for a radiation pyrometer comprising a first concave mirror for direction toward an area of a source of radiant energy, a second concave mirror, means for supporting said mirrors in face-to-face relation within the housing of the radiation pyrometer, means including said first mirror for producing an optical image of the source of radiant energy in the focal plane of said first mirror conjugate to said source and for interception by said second mirror of radiant energy from a fractional area of said optical image, and a radiant-energy responsive detector having a sensitive area disposed between said mirrors in a second plane to receive from said second mirror said intercepted radiant energy from said fractional area of said optical image, said second mirror having high energy-concentrating properties so as to concentrate the radiant energy received from said first mirror upon an area within the confines of said sensitive area.

8. An improved optical system for a radiation pyrometer comprising a first concave mirror for direction toward an area of a source of radiant energy, a second concave mirror, means for supporting said mirrors in face-to-face relation within the housing of the radiation pyrometer, means including said first mirror for producing an optical image of the source of radiant energy and for interception by said second mirror of radiant energy from a fractional area of said optical image, means disposed between said mirrors for correcting aberrations produced by said first concave mirror, and a radiant-energy responsive detector having a sensitive area disposed between said mirrors to receive from said second mirror said intercepted radiant energy from said fractional area of said optical image, said second mirror having high energy-concentrating properties so as to concentrate the radiant energy received from said first mirror upon an area within the confines of said sensitive area.

9. In a radiation pyrometer for measuring the temperature of a body from which radiant energy is emitted, an optical system comprising a first optical element for intercepting radiant energy from an area of the body, a second optical element disposed for intercepting from said first optical element radiant energy from a portion only of said area of the body, means disposed between said optical elements for correcting aberrations produced by said first optical element, and a radiant-energy sensitive detector disposed for intercepting radiant energy redirected from said second optical element, said second optical element having high energy-concentrating properties for concentration of the radiant energy upon said detector to provide a greater intensity of radiant energy at said detector than at said second optical element.

10. In a radiation pyrometer for measuring the temperature of a surface, the combination affording accurate measurements despite variation in area of said surface comprising a first concave mirror disposed for intercepting radiant energy from an area of said surface and for producing in the focal plane of said first mirror conjugate to said area of said surface an optical image of said area of said surface, means disposed in said focal plane of said first mirror defining a fractional area of said optical image, a second concave mirror, a radiant-energy responsive detector disposed in the focal plane of said second mirror conjugate to said defining means, said second concave mirror having a numerical aperture greater than that of said first concave mirror for producing an optical image of said fractional area of said first-named image on an area of said radiant-energy responsive detector.

11. An optical system for a radiation pyrometer comprising a first reflecting element for receiving directly the radiant energy emitted from an area of a body, a diaphragm disposed in the focal plane of said first reflecting element conjugate to said area for receiving the radiant energy of the body area reflected from said first element to form an optical image of said area thereon, said diaphragm having an opening therein for passage therethrough of radiant energy from only a fractional area of said optical image, a second reflecting element disposed in spaced relation with said diaphragm for intercepting the radiant energy passing through said opening, and a radiant-energy sensitive detector disposed between said diaphragm and said second element receiving the radiant energy reflected from said second element for production of an optical image of said opening in said diaphragm on the surface of said detector.

12. The combination set forth in claim 11 wherein said detector and said opening in said diaphragm are disposed at the conjugate foci of said second reflecting element and said second reflecting element comprises a concave spherical mirror having high energy-concentrating properties for increasing the density of radiant energy at said detector over the density of radiant energy at said opening in the diaphragm by concentrating the radiant energy received through said opening upon an area of said detector of less diameter than the area of said opening.

13. An optical system for a radiation pyrometer comprising a diaphragm, a first optical element for intercepting directly the radiant energy emitted from an area of a body, said first element disposed for directing the radiant energy received from said area of the body upon one surface of said diaphragm positioned in the focal plane of said first optical element conjugate to said area to form an optical image of said area, said diaphragm having an opening for passage therethrough of radiation from only a sharply defined area of said body and defining a fractional area of said optical image, a reflecting element disposed in spaced relation with respect to the opposite surface of said diaphragm for intercepting all of the radiant energy passing through said opening in said diaphragm, and a radiant energy sensitive area interposed between said diaphragm and said reflecting element for receiving thereon substantially all of the radiant energy reflected from said reflecting element for production upon said radiant-energy sensitive area of an optical image of said opening, said last-named image being of smaller area than the area of either said opening or said radiant-energy sensitive area.

14. An optical system for a radiation pyrometer comprising, a narrow angle spherical mirror for intercepting radiant energy from a source, a diaphragm positioned in the focal plane of said narrow angle mirror conjugate to said source, said narrow angle mirror producing upon the surface of said diaphragm an optical image of the source of the radiant energy, said diaphragm having an opening for passage therethrough of radiant energy from only a sharply defined area of said source corresponding to the portion of said image circumscribed by the periphery of said opening, a wide angle spherical mirror disposed for intercepting the radiant energy passing through said opening in said diaphragm, and a radiant-energy sensitive detector disposed between said wide angle mirror and said diaphragm in the focal plane of said wide angle mirror conjugate to said diaphragm, said wide angle mirror producing upon said detector an optical image of said opening in said diaphragm, which image is smaller in size than said opening.

15. An optical system for a radiation pyrometer comprising a narrow angle reflecting element for intercepting radiant energy directly from a source, a housing, a diaphragm forming one wall of said housing, said narrow angle reflecting element being disposed in spaced relation with the outer surface of said diaphragm for production upon said surface of an optical image of the source of radiant energy, said diaphragm having an opening for passage therethrough of radiant energy from only a sharply defined fractional area of said source corresponding to the fractional portion of said image circumscribed by the periphery of said opening, a wide angle reflecting element disposed within said housing for intercepting all of the radiant energy passing through said opening in said diaphragm, and a radiant-energy sensitive detector disposed within said housing between said wide angle reflecting element and said diaphragm, said wide angle reflecting element producing upon said detector an optical image of said opening in said diaphragm, which image is smaller in size than said opening.

16. In a radiation pyrometer for measuring the temperature of a hot body, an optical system comprising a first optical element for intercepting radiant energy from an area of the hot body, a second optical element disposed for intercepting from said first optical element radiant energy from a fractional area only of said area of the hot body, selective radiant-energy filtering means interposed between said first and second optical elements to limit the radiant energy intercepted by said second optical element to a selected band of wavelengths, and a radiant-energy sensitive detector disposed for receiving said selected radiant energy, said second optical element having high energy-concentrating properties for concentrating all of said selected radiant energy on a surface area of said radiant-energy sensitive detector.

17. The combination set forth in claim 16 wherein said selective radiant-energy filtering means and said radiant-energy sensitive detector are disposed at the conjugate foci of said second optical element.

18. An improved optical system for visually sighting a radiation pyrometer on a selected area of a hot body comprising an optical element for intercepting radiant energy from said selected area of the hot body, a diaphragm having an opening therein, said intercepted radiant energy producing on said diaphragm an optical image of said selected area of the hot body and means in line with said opening for viewing said image on said diaphragm for alignment of a selected fractional area of said image with said opening in said diaphragm.

19. An improved optical system for visually sighting a radiation pyrometer on a selected area of a hot body comprising a concave mirror for intercepting radiant energy from said selected area of the hot body, a diaphragm having an opening therein, said diaphragm disposed between said mirror and said hot body for production on said diaphragm by reflection from said mirror of an optical image of said selected area, a thermally-responsive element disposed in alignment with the opening in said diaphragm, and a lens disposed behind an uncoated portion of said mirror for viewing the position of said image on said diaphragm.

20. A radiation pyrometer for the measurement of the temperature of a body from which radiation is emitted comprising a first optical element for intercepting radiant energy from an area of said body and for producing an optical image of said area in the focal plane of said first optical element conjugate to said area, means including a second optical element intercepting radiant energy from a fractional area of said optical image, the principal axes of said optical elements coinciding with the axis of said optical system, said radiation pyrometer including a hot-junction area of a thermocouple spaced from said plane and to which said radiation is to be directed, said hot-junction area having its axis coincident with said axis of said optical system and being disposed between said second optical element and the center of curvature thereof in the focal plane of said second optical element conjugate to said focal plane of said first optical element for concentration within said last-named area of the radiant energy from said fractional area of said optical image.

21. In a radiation pyrometer, the combination comprising a housing, a reflecting element supported within said housing for intercepting radiant energy passed through an opening in said housing, a diaphragm disposed between said opening and said reflecting element, a plurality of apertures in said diaphragm for passage of radiant energy therethrough, one of said apertures being a target-defining aperture precisely regulating the passage of radiant energy reflected from said reflecting element, and a radiation-responsive means disposed on the opposite side of said diaphragm from said reflecting element to receive the portion of the reflected radiant energy from said reflecting element which passes through said target-defining aperture of said diaphragm.

22. In a radiation pyrometer, the combination comprising a housing, a reflecting element supported within said housing for intercepting radiant energy passed through an opening in said housing, a diaphragm disposed between said opening and said reflecting element, a plurality of apertures in said diaphragm for passage of radiant energy therethrough, a radiation-responsive means supported in spaced relation to said diaphragm opposite the side of said diaphragm facing said reflecting element and axially positioned to receive radiant energy from said reflecting element and selective radiant-energy filtering means supported within said housing and interposed between said reflecting element and said radiation-responsive means to limit the radiant energy received by the latter to a selected band of wavelengths.

23. In a radiation pyrometer, the combination comprising a housing, a first reflecting element supported within said housing for intercepting radiant energy passed through an opening in said housing, a diaphragm disposed between said opening and said reflecting element, a plurality of apertures in said diaphragm for passage of radiant energy therethrough, a second reflecting element supported from said diaphragm in face-to-face relation with said first reflecting element and on the opposite side of said diaphragm from said first reflecting element, a radiation-responsive means supported from said diaphragm on the side thereof adjacent said second reflecting element to receive radiant energy reflected from said reflecting elements and selective radiant-energy filtering means supported from said diaphragm and interposed between said first reflecting element and said radiation-responsive means to limit the radiant energy received by the latter to a selected band of wavelengths.

24. A radiation pyrometer for measuring the temperature of a body from which radiant energy is emitted, comprising a radiant-energy sensitive element, a first optical element, diaphragm means including an opening, a second optical element, all of said elements and said diaphragm means being disposed in optical alignment and in separate parallel planes, said sensitive element being disposed in the focal plane of said second optical element, and said first optical element being adjustable relative to said diaphragm means to focus a real image of an area of the body upon the adjacent surface of said diaphragm means so that said diaphragm means and said area of the body will be at the conjugate foci of said first optical element with said real image being of an area greater than the area of said diaphragm opening.

25. A radiation pyrometer according to claim 24 wherein said diaphragm means comprises a plate member having an opening extending therethrough, and said first and second optical elements both comprise concave mirrors.

26. A radiation pyrometer according to claim 24 wherein said first optical element comprises a lens, said second optical element comprises a concave mirror, and said diaphragm means comprises a perforated plate supported therebetween.

27. A radiation pyrometer according to claim 24 wherein said first and second optical elements comprise concave mirrors and said diaphragm means comprises a flat annular rim surrounding the edge of said second optical element, and the opening in said diaphragm means has a diameter coextensive with the aperture of said concave mirror forming said second optical element.

28. A radiation pyrometer for the measurement of the temperature of a body from which radiation is emitted, comprising a first optical element for intercepting radiant energy directly from an area of the body for producing a real image of said area, diaphragm means supported with a surface thereof facing said first optical element and positioned substantially in the focal plane of said first optical element conjugate to that of the radiating body so that said real image of the body will be produced on said surface of said diaphragm and cover an area within which there is a diaphragm opening of smaller area than the area of said real image, a second optical element supported in optical alignment with said first optical element in a position such that the focal plane of said second optical element is a plane parallel to but spaced from said conjugate focal plane of said first optical element so as to intercept radiant energy from the portion of the real image outlined by said diaphragm opening, and a radiant-energy sensitive element supported in optical alignment with and in the focal plane of said second optical element conjugate to that of said diaphragm opening.

29. A radiation pyrometer for measuring the temperature of a body from which radiant energy is emitted, comprising a radiant-energy sensitive element, a narrow angle optical element, diaphragm means including an opening, a wide angle optical element, all of said elements and said diaphragm means being disposed in optical alignment and in separate parallel planes, said diaphragm and said sensitive element being disposed at the conjugate foci of said wide angle optical element, and means for adjusting said narrow angle optical element relative to said diaphragm means to focus a real image of an area of the body upon said diaphragm means so that said diaphragm means and said area of the body will be at the conjugate foci of said narrow angle optical element with said real image being of an area greater than the area of said diaphragm opening.

References Cited in the file of this patent

UNITED STATES PATENTS

| | | |
|---|---|---|
| Re. 23,615 | Fastie | Jan. 13, 1953 |
| 842,314 | Heelay et al. | Jan. 29, 1907 |
| 1,639,412 | Mechau | Aug. 16, 1927 |
| 2,043,347 | Clavier et al. | June 9, 1936 |
| 2,212,211 | Pfund | Aug. 20, 1940 |
| 2,357,193 | Harrison | Aug. 29, 1944 |
| 2,432,920 | McKay et al. | Dec. 16, 1947 |
| 2,441,672 | Ray | May 18, 1948 |
| 2,489,835 | Traub | Nov. 29, 1949 |
| 2,504,384 | Bouwers | Apr. 18, 1950 |
| 2,562,538 | Dyer | July 31, 1951 |
| 2,601,508 | Fastie | June 24, 1952 |
| 2,627,530 | Fastie | Feb. 3, 1953 |

FOREIGN PATENTS

| | | |
|---|---|---|
| 324,500 | Great Britain | Jan. 30, 1930 |
| 344,019 | France | Aug. 23, 1904 |

OTHER REFERENCES

Griffiths Text, "Methods of Measuring Temperature," 1918, pages 90, 91.